Patented May 11, 1937

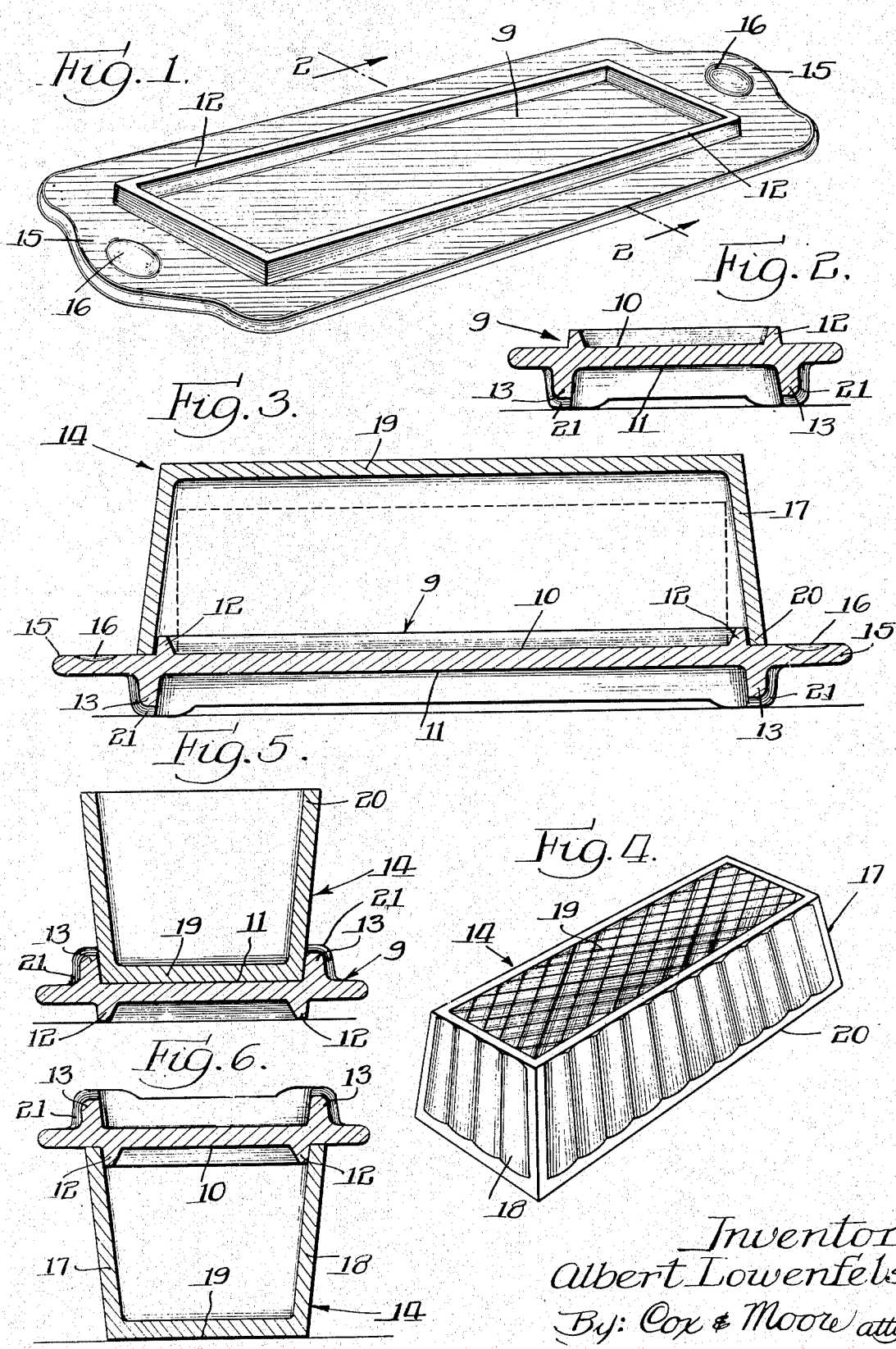

2,080,283

UNITED STATES PATENT OFFICE 2,080,283

BUTTER DISH

Albert Lowenfels, White Plains, N. Y.

Application October 10, 1935, Serial No. 44,343

4 Claims. (Cl. 65—59)

This invention relates to a convertible butter dish which comprises a plate and a cover for the plate. The cover may also be used as a bowl or receptacle by inverting it so that the top of the cover becomes the base of the bowl. The plate is constructed on one side with a surface to support the cover in its normal position and on the other side to support the receptacle or bowl. The plate is also adapted to serve as a cover for the receptacle.

The object of this invention is primarily to provide a rectangular dish to support a butter bar of the conventional form and to provide a cover for the dish.

Another object of the invention is to provide a butter dish and cover therefor for convenient use in a refrigerator.

Another object of the invention is to provide a plate and a cover therefor which may also be used as a receptacle.

Referring to the drawing:

Fig. 1 is a perspective view of the plate;

Fig. 2 is a sectional view on the lines 2—2 of Fig. 1;

Fig. 3 is a longitudinal sectional view through the cover and the plate. The dotted lines indicate the position of the butter bar;

Fig. 4 is a perspective view of the cover;

Fig. 5 is a transverse sectional view showing the cover used as a receptacle and shows the plate in position to support the receptacle; and Fig. 6 is a transverse sectional view showing the plate in position as a cover for the receptacle.

The butter dish consists of a plate and a cover. The plate 9 is substantially rectangular in shape, having plane upper and lower surfaces 10 and 11. A marginal rib 12 is formed upon the upper side of the plate enclosing an area large enough to receive within its border a bar of butter. The opposite side of the plate is formed with a rib 13 similar to rib 12 except that it is nearer the edge of the plate. At each corner the rib 13 is enlarged outwardly and downwardly to provide low feet 21. The inner edge of the rib 13 is substantially in line with the outer edge of the rib 12 on the opposite side of the plate. This offset relationship tends to strengthen the outer rim of the plate against breakage by distributing the mass and strength of the two ribs over a greater space, avoiding concentration on one line. The plate may be made of glass or equivalent moldable material or the like.

The cover 14 for the plate in shape and size is adapted to cover a bar of butter without contacting the bar and has oppositely sloping sides 17 and ends 18 and a flat top portion 19. The margin 20 of the cover fits snugly about the rib 12, on the top of the plate, as shown in Fig. 3. The sides and the ends of the cover slope so that the top 19 fits snugly within the rib 13 on the side 11 of the plate 9.

The cover may also be used as a receptacle or bowl by inverting it so that the top of the cover 19 becomes the bottom of the receptacle, as shown in Fig. 5, in which figure the butter plate 9 is shown inverted so that the surface 11, and the rib 13 form a seat for the receptacle 14.

The outward and downward extensions on rib 13, providing feet 21, insure that when the cover 14 is used open side downward as to cover a bar of butter, the margin of the cover will be placed about the rib 12 and no attempt will be made to place it about the rib 13. The space defined by the rib 13 is of greater dimensions than the top 19 of the cover and the feet 21 do not extend into such space, leaving the space clear to receive the top 19 of the cover.

As shown in Fig. 6, the plate 9 may also be used as a cover or lid for the receptacle or inverted cover. When so used as a cover, the plate 9 is turned with the face 10 down and with the rib 12 within the receptacle to prevent horizontal movement of the plate with respect to the receptacle. The ends of the plate are provided with projections 15 to serve as handles, which projections are formed with depressed portions 16 to serve as thumb or finger grips. These depressions are on the side 10 of the plate and serve to indicate the side upon which the butter is placed and covered.

The various purposes for which the device may be used are apparent from the preceding description. As a container for butter it occupies little room in the family refrigerator. The cover serves to retain the flavor of the butter and prevents odors in the refrigerator from being absorbed by the butter. The rib 12 serves to retain the cover in position.

The butter may be served from the plate 9, with or without the cover. If ice cubes are to be used in serving the butter, the butter slices and the cubes can be placed in the receptacle formed by the inverted cover, as indicated in Fig. 5. In that case, also, the unused butter slices and the ice cubes may be placed in the refrigerator and covered by the plate 9 with the rib 12 within the margin of the receptacle, as shown in Fig. 6.

When the parts are arranged as shown in Fig. 6, ice cubes may be placed in the receptacle and the sliced butter placed on the top of the plate and thereby kept cool, while the butter is being served at the table or elsewhere.

It is apparent from the description and the illustration that the device can be used for storing and serving other food products besides butter.

Obviously, those skilled in the art to which this invention pertains may make various changes in the construction and the arrangement of the parts shown in the drawing without departing from the spirit of this invention, and therefore I do not wish to be limited except as hereinafter set forth in the appended claims.

Having fully described my invention, I claim:

1. A butter dish comprising a plate and a cover, said plate having a rectangular rib on one face adapted to be received within the mouth of said cover, and a second angular rib on the other face of the plate offset outwardly and vertically from said first rib, said cover having sloping sides and a flat top shaped to fit within the second rib on the plate whereby the cover forms an open dish.

2. A convertible dish comprising a plate and a receptacle, said plate having an outer rectangular rib adjacent the margin of the plate and an inner rectangular rib on the opposite side of the plate lying within the vertical planes of the inner edges of the outer rib, said receptacle having a rectangular base shaped to fit within the outer rib, said base having diverging sides forming a marginal portion adapted to fit around the inner rib, whereby a cover and cooperating plate is formed when the marginal portion of the receptacle is placed about the inner rib, and a bowl and support therefor are formed when the base of the receptacle is placed within the outer rectangular rib.

3. A butter dish comprising a cover having a rectangular body portion including a top, sides and having an open bottom forming an enclosure so shaped as to enclose a rectangular bar of butter, in combination with a relatively flat rectangular bottom plate, said plate comprising a slab of moldable material of generally uniform thickness throughout, the top surface of said plate being generally plane and being provided with an upstanding rectangular ridge set in from the rectangular margin of the plate and adapted to be operatively received within the open end of said cover whereby relative horizontal displacement of the cover and plate is prevented, said ridge being spaced from said margin by a substantially horizontal portion generally coplanar with said top surface and adapted to form a support for said cover in operative position and the bottom of said plate being provided with a support comprising a downwardly formed ridge defining a rectangular depression.

4. A butter dish comprising a plate and a cover, said plate having an upstanding continuous rib on one face adapted to be received within the mouth of the cover, and a second continuous rib on the other face of the plate offset outwardly and vertically from said first named rib, the portions of the plate on both sides thereof within the continuous ribs comprising flat imperforate surfaces, said cover being imperforated and adapted to fit within the second named rib.

ALBERT LOWENFELS.